United States Patent [19]

Drewes et al.

[11] Patent Number: 4,575,904
[45] Date of Patent: Mar. 18, 1986

[54] GUY HOOK

[75] Inventors: John H. Drewes, Birmingham, Ala.; Richard J. Gemra, Millington, N.J.

[73] Assignee: Bell Communications Research, Inc., Livingston, N.J.

[21] Appl. No.: 673,585

[22] Filed: Nov. 21, 1984

[51] Int. Cl.⁴ .............................................. F16G 11/00
[52] U.S. Cl. ................................. 24/115 K; 24/115 R; 403/211; 248/219.4; 411/119
[58] Field of Search ............ 24/115 K, 115 G, 115 R; 403/211; 411/119, 120, 123, 124; 248/219.4

[56] References Cited

U.S. PATENT DOCUMENTS

| | | | |
|---|---|---|---|
| 1,350,139 | 8/1920 | Clopton | 411/123 |
| 1,382,799 | 6/1921 | Purple | 411/119 |
| 1,813,482 | 7/1931 | Chance | 24/115 K |
| 2,022,386 | 1/1935 | Pittman | 248/71 |
| 2,274,411 | 12/1940 | Hill et al. | 248/219.04 |
| 2,643,428 | 6/1951 | Jenne | 403/190 |
| 2,867,874 | 1/1959 | Larson | 24/115 K |
| 2,901,798 | 4/1955 | Jenne | 24/115 K |
| 2,983,010 | 11/1959 | Huggins | 249/131 |
| 3,241,797 | 3/1966 | Anderson | 248/71 |
| 3,272,463 | 11/1964 | Greig | 248/65 |
| 3,333,303 | 8/1967 | Pierre | 24/115 R |
| 3,350,750 | 11/1967 | Scarr et al. | 403/211 |
| 3,555,747 | 1/1971 | Taylor | 248/219.4 |
| 3,559,250 | 6/1969 | Huggins | 24/115 K |
| 3,561,708 | 2/1969 | Dubey | 248/63 |
| 3,593,384 | 4/1969 | Huggins | 240/45 |

FOREIGN PATENT DOCUMENTS 111028 11/1917 United Kingdom ................ 403/211

OTHER PUBLICATIONS

Continental Electric Co., Advertising Brochure, "Con-O-Line Higher Performance, Low Cost Guy Attachment and Pole Washer" for GAD-56.

Primary Examiner—Victor N. Sakran
Attorney, Agent, or Firm—James W. Falk; Stephen M. Gurey

[57] ABSTRACT

A guy hook used to attach a guy cable to a transmission line pole includes an upper body portion (25), a central body portion (26), and a lower heel portion (27). The upper portion has a neck (29) and ears (28) for engaging the guy cable. The central body portion has a rearward pole-engaging surface (37), an opposite frontward side and a passageway (40) therebetween through which a through-bolt is horizontally disposed to install the hook on the pole. The frontward side includes a recess (38) surrounding the aperture (39) to the passageway for countersinking the head of a through-bolt below the frontward side to a depth substantially in line with the vertical line of action (41–42) of the hook. The moment caused by the downward and outward force exerted on the hook by the guy cable is thus minimized and therefore also the tendency of the hook to overturn and bend the through-bolt. The heel portion is vertically dimensioned to approximately 50 percent of the total height of the hook and has spurs (30–34) arranged on its pole engaging surface to maximize resistance to downslotting of the hook along the pole.

1 Claim, 10 Drawing Figures

GUY HOOK

BACKGROUND OF THE INVENTION

This invention relates to a guy hook used to attach guy wires to transmission line poles and more particularly to a guy hook used to attach down guys at a dead end transmission line pole.

The guy hook of the present invention is an improvement over prior art guy hook structures of the type disclosed, for example, in the U.S. Pat. No. 2,983,010 to O. W. Huggins, dated May 9, 1961. These prior art guy hooks generally include upper, central and lower body portions. The upper body portion includes a neck and ears for engaging the guy wire. The central body portion has frontward and rearward sides. The rearward side is in the shape of an inverted-U and provides a bearing surface between the hook and the pole. A channel is formed from this rearward inverted-U bearing surface to an aperture in the frontward side, the aperture and channel being adapted to receive a through-bolt therethrough to attach the hook to the pole. The lower body portion, or heel, of the hook includes spikes on a surface shaped to conform with circumference of the pole and which together with the aforenoted U-shaped bearing surface form the total contact region between the hook and the pole.

In the field, the installer will bore a hole in the dead end transmission line pole perpendicular to the vertical axis of the pole. The down guy hook is affixed to the pole by means of the through-bolt which is inserted through the aperture of the hook and through the bored hole and then tightened until the hook is firmly in contact with the pole and the spikes embedded therein. The down guy cable is engaged around the neck of the guy hook and tightened so that a downward and outward force is applied to the down guy hook. This force tends to cause the hook to move downward on the pole (down-slot) and to overturn and bend the through-bolt due to the moment created by the force. Resistance to the former is intended to be offered by the spiked heel. As noted in the aforenoted Huggins patent, the overturning action that tends to bend the through-bolt is intended to be eliminated by inclining the through-bolt channel so that its upper surface extends at an upward and outward angle from the rearward pole-engaging surface to permit the hook to be overturned by the downward and outward force without bending the through-bolt.

Performance of these prior art type of guy hooks in the field environment is frequently less than satisfactory. At the dead end of a transmission line, two of these prior art type of guy hooks are generally connected back-to-back on opposite side of the transmission line pole using a single through-bolt. A down guy cable is connected to one guy hook and a suspension strand cable (parallel to the ground) is connected to the opposite hook. In many of these installations, severe pole damage has been encountered. In particular, on the down guy side the overturning moment exerted on the hook has frequently bent the bolt, notwithstanding theoretical predictions otherwise. Furthermore, the heel has provided insufficient resistance and has been pulled downward and into the pole when the hook is overturned. On the span side, the rearward inverted-U central section of the hook has been found embedded into the pole. On both the down and span side, such damage threatens the structural integrity of the pole. Furthermore, overturning and downslotting of the down guy hook may loosen the tension on the down guy cable to a point that the pole is no longer firmly anchored.

SUMMARY OF THE INVENTION

The overturning and downslotting that result from the downward and outward force exerted by a down guy cable on a guy hook and cause bolt bending and pole damage are minimized by the down guy hook of the present invention. In accordance with the down guy hook of the present invention, the through-bolt aperture is countersunk below the front surface of the central section of the hook and a recess provided that is adapted to receive the head of the through-bolt. In addition, the heel is dimensioned so that its vertical height is approximately 50 percent of the total height of the hook and the spikes arranged thereon to maximize the number of different pole fibers that are captured. By countersinking the through-bolt below the front surface of the hook the moment arm created by forces on the cable and on the bolt is reduced thereby reducing the tendency of the hook to overturn and the bolt to bend. In particular, the recess is countersunk to a level that is substantially in line with the vertical center line of action of the hook. Thus, no eccentric loads are created on the bolt and guy hook by the down guy thus minimizing the overturning action. The countersunk through-bolt recess and the improved heel section jointly combine to minimize the overturning and pole embedding effects that have been found to exist in prior art down guy hooks.

BRIEF DESCRIPTION OF THE DRAWING

To facilitate understanding, identical reference numerals are used to designate identical elements common to the figures.

DETAILED DESCRIPTION

Figure 1:
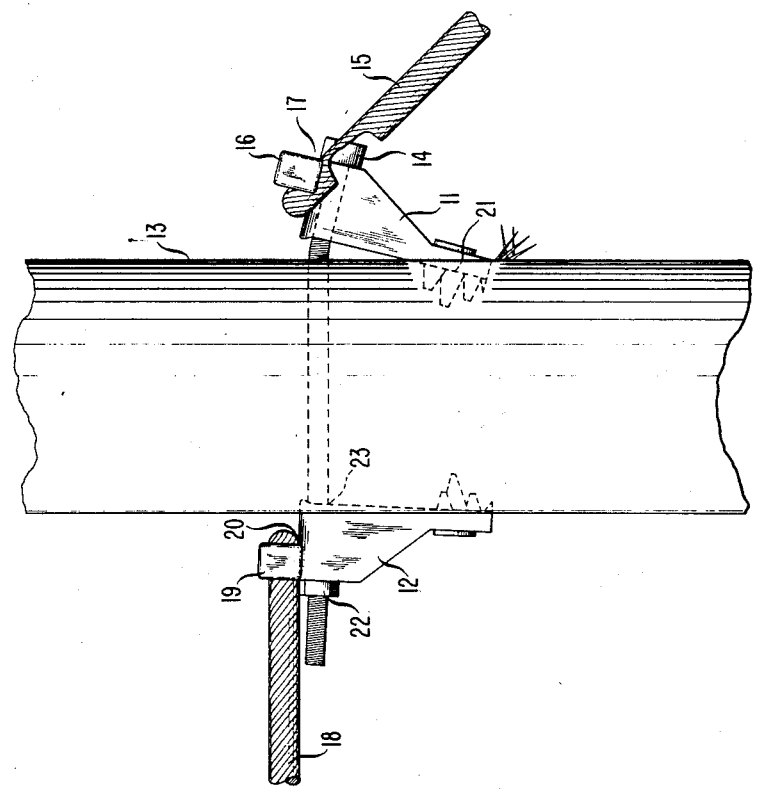
FIG. 1 shows a side view of two prior art guy hooks installed on a pole with a common through-bolt which are overturned and embedded within the pole from the forces exerted thereon by the attached down guy cable and suspension strand cable.
Figure 2:
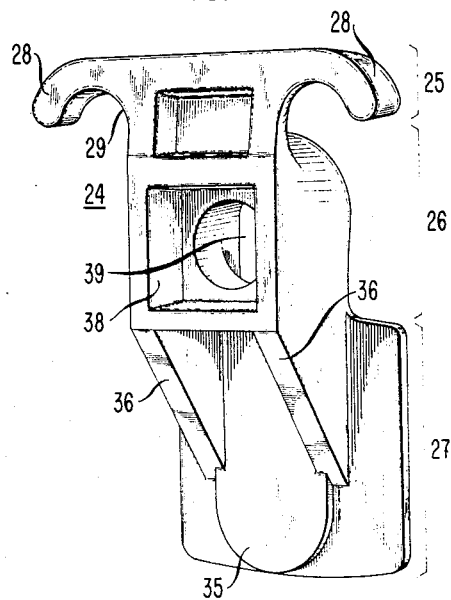
FIG. 2 shows a front facing perspective view of the guy hook of the present invention.
Figure 3:
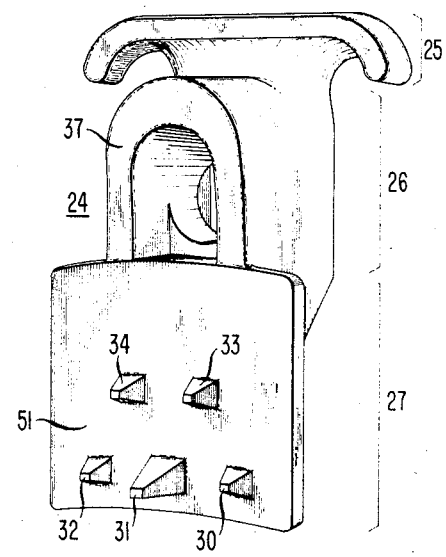
FIG. 3 shows a rear facing perspective view.
Figure 4:
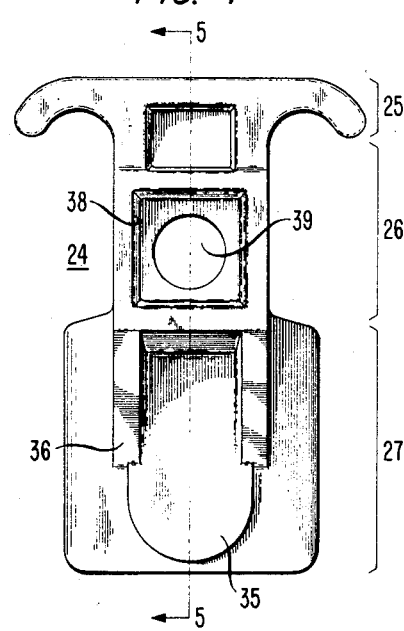
FIG. 4 shows a front elevation view.
Figure 5:
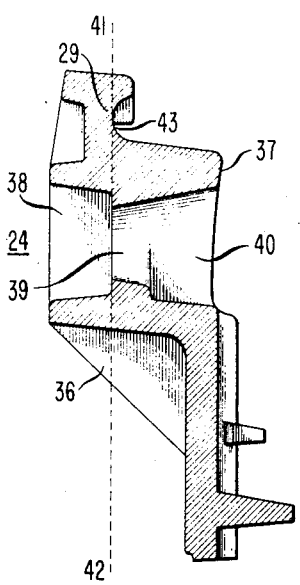
FIG. 5 shows a sectional side view through line 5—5 in FIG. 4.
Figure 6:
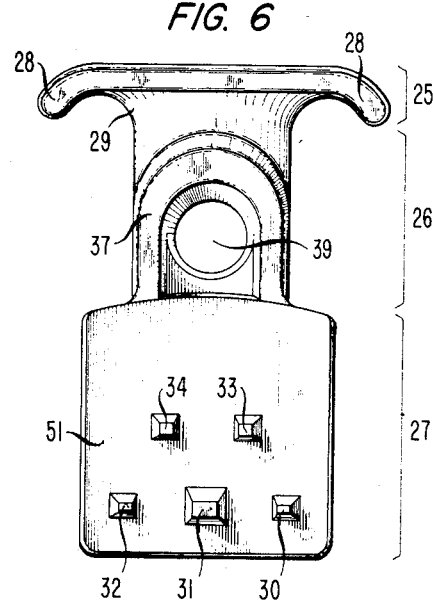
FIG. 6 shows a rear elevation view.
Figure 7:
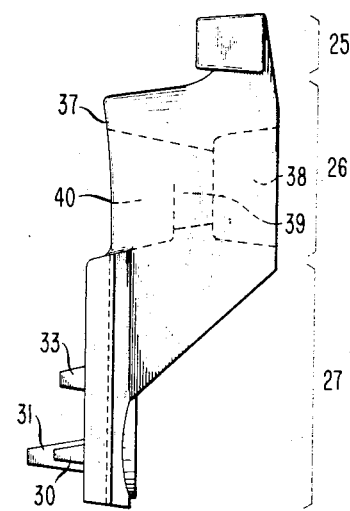
FIG. 7 shows a side elevation.
Figure 8:
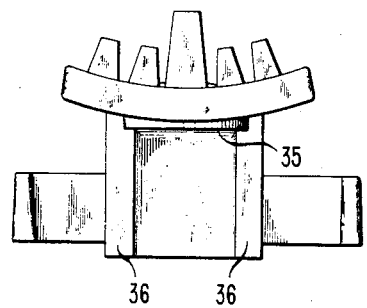
FIG. 8 shows a bottom plan view.
Figure 9:
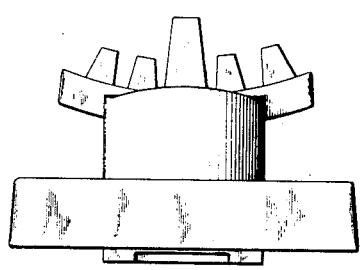
FIG. 9 shows a top plan view.

With reference to FIG. 1, two prior art guy hooks 11 and 12 of the type heretofore described are shown affixed to a transmission line pole 13 by means of a common through-bolt 14. Down guy cable 15 is engaged around the ears 16 and neck 17 of hook 11 and suspension strand cable 18 is engaged around the ears 19 and neck 20 of hook 12. As aforenoted, the downward and outward force exerted by down guy 15 on hook 11 tends to overturn the hook 11 and bend through-bolt 14 as shown. Simultaneously, this same force causes hook 11 to downslot along the vertical axis of the pole, insufficient resistance being provided between the heel portion 21 and the pole 13. Also, the force exerted on hook 12 by through-bolt 14 via nut 22 on through-bolt 14 causes the upper bearing surface 23 of hook 12 to become embedded, as can be noted, in pole 13. Damage to the pole therefore occurs, on both the down guy and suspension strand sides of the pole.

With reference now to FIGS. 2-9 of the drawing, the guy hook 24 of the present invention can be noted. The guy hook is preferably formed from malleable cast iron and includes an upper body portion 25, a central body portion 26 and a lower body heel portion 27 all integrally cast as a single unit. The upper body portion 25 include ears 28 and a neck 29. The lower body heel portion 27 is arc shaped to conform on its pole-engaging surface 51 with the circumference of the transmission line pole. The rearward pole-engaging surface 51 of heel section 27 includes spurs 30-34 arranged thereon so that spurs 33 and 34 in the upper row are vertically displaced with respect to spurs 30-32 in the lower row. The center spur 31 in the lower row is longer than the other spurs to provide deeper penetration into the wood pole. The frontward side of heel section 27 includes a planar surface 35 used as a striking pad by the installer for firmly seating the spurs into the pole.

The central body portion 26 of the hook is integrally affixed to the heel 27 and supported by means of ribs 36. The rearward pole-engaging surface of the central portion 26 has an inverted-U shape to provide a bearing surface 37 for contact between the pole and the hook. Surface 37 concavely curves upward and outward (see FIGS. 5 and 7) to provide an upper edge that 'bites' into the pole to assist in eliminating downslotting and separation of the hook from the pole. The frontward substantially vertical face of the central body portion 26 includes a square recess 38 adapted for accepting the head of a through-bolt therein. A circular aperture 39 in the wall of recess 38 parallel to the frontward face of the central body section 26 is sized to accept the shank of a through-bolt. A channel 40 is formed within the metal material of the hook between aperture 39 and the inverted-U rearward bearing surface 37.

In order to minimize the eccentric load that tends to bend the through-bolt and overturn the hook when a downward and outward load is imposed on hook 24 by a down guy cable engaged around the neck 29 of the installed hook, recess 38 is countersunk below the frontward face of the hook to a depth that is substantially in line with the vertical line of action 41-42 (FIG. 5) of the hook. Thus, as can be noted in FIG. 5, the bottom surface (depthwise) of recess 38 is in substantially the same plane as the vertical line of action 41-42 which is in line with the point 43 at which the down guy cable imposes a load to the hook at neck 29. The eccentric load that tends to bend the through-bolt and overturn the hook is thus minimized.

The heel section 27 of the hook of the present invention provides superior performance over prior art guy hooks in resisting down-slotting. Improved resistance to down-slotting is achieved by increased surface contact between the pole and the heel and an arrangement of spurs that minimizes damage to the pole fibers and increases the resistance to the downwardly applied force. As noted in FIGS. 3 and 6, heel 27 is dimensioned vertically to be approximately 50 percent of the total vertical height of the hook. In addition, the spurs 30-34 in the adjacent rows are distinctly vertically offset from each other. Each spur therefore captures wood fibers that are separate from the fibers captured by either the spurs in the same or adjacent rows.

Figure 10:
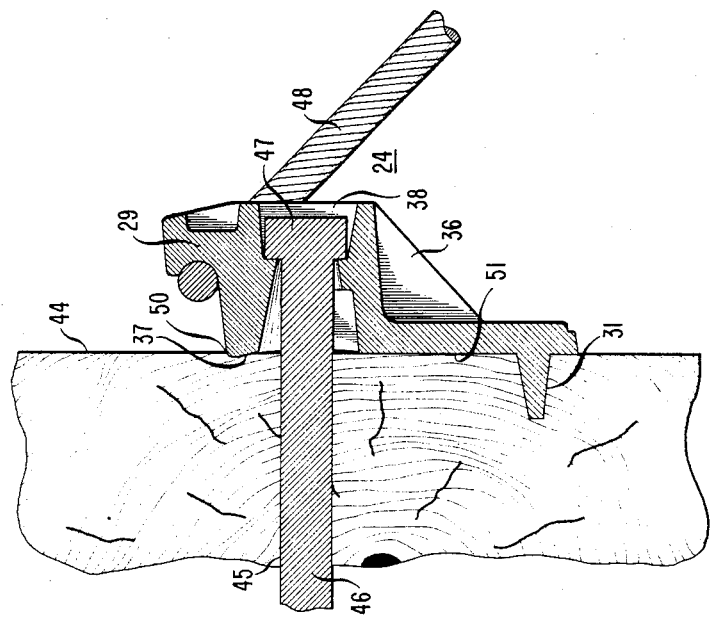
FIG. 10 shows a side sectional view of a guy hook of the present invention installed on a transmission line pole and having a down guy engaged therewith.

With reference to FIG. 10, a sectional view of hook 24 is shown installed on a transmission line pole 44. The installer drills a diametrically extending hole 45 through the pole 44. A through-bolt 46 is disposed through the aperture 39 of the hook and the head 47 of through-bolt 46 is captured within countersunk recess 38. At the diametrically opposite side of the pole 44, (not shown) the projecting shank of through-bolt 46 is secured to the pole by either a nut and washer or is engaged with another guy hook of a type not dissimilar to the aforedescribed prior art type of guy hook in an arrangement similar to that shown in FIG. 1. Once the hooks are vertically aligned along the pole, the nut on the opposite side is tightened until the hook or hooks are firmly in contact with the pole surface. The spurs 30-34 are embedded into the pole surface by blows to striking pad 35, which is preferably performed in cooperation with tightening of the nut to assure a firm contact between the pole surface and both bearing surface 37 and the interior pole-engaging surface 51 of heel 27. Advantageously, by capturing the head 47 of through-bolt 46 within recess 38, the need for the installer to hold immovable the head of the through-bolt with a wrench while tightening the nut on the opposite side of the pole is obviated.

Once the down guy hook is affixed to the pole 44, the down guy cable 48 is engaged around the neck 29 and tightened thereby imposing a load on the hook. Since the point of application 43 of the vertical component of this load is substantially in line with bolt head 47 of through-bolt 46, the moment that would otherwise tend to cause the hook to overturn is minimized. The vertical component of this load is resisted by the pole at its points of contact with the heel section 29 and at the vertically uppermost contact point 50 on the rearward side of the hook which also digs into the pole. Sheer strain upon the through-bolt 46 remains minimum and through-bolt 46 remains in tension axially resisting the horizontal component of the guy load.

Other embodiments may be devised by those skilled in the art without departing from the spirit and scope of the present invention.

What is claimed is:

1. A guy hook for attachment to transmission line poles comprising an integrally connected upper body portion, a central body portion and a lower heel portion, said upper body portion having ears and a neck for engaging a guy cable, said central body portion having a substantially vertical frontward face, an opposite rearward surface for receiving a horizontal through-bolt, said heel portion having a rearward pole-engaging surface shaped to conform with the circumference of a transmission line pole and having a plurality of spurs for engaging the fibers of said pole, and means for minimizing the overturning and downslotting of said hook when said hook is attached to the transmission line pole and the guy wire is engaged around said neck, said means comprising said rearward pole-engaging surface of said central body portion being concavely curved upward and outward to provide an upper edge to bite onto said pole, said rearward pole-engaging surface of said heel portion being dimensioned to be approximately 50 percent of the total vertical height of said hook, and a countersunk recess being formed in said frontward face of said central portion around said passageway and dimensioned for receiving and capturing the head of the through-bolt, the bottom countersunk surface of said recess being substantially in the same plane as the vertical line of action of said hook at the point of contact between the guy cable and said neck.

* * * * *

UNITED STATES PATENT AND TRADEMARK OFFICE
CERTIFICATE OF CORRECTION

PATENT NO. : 4,575,904
DATED : March 18, 1986
INVENTOR(S) : John H. Drewes and Richard J. Gemra It is certified that error appears in the above-identified patent and that said Letters Patent is hereby corrected as shown below:

On the front page, the Assignee

-- BellSouth Corporation, Atlanta, Georgia -- should precede Bell Communications Research, Inc., Livingston, N.J.

Signed and Sealed this

Twenty-ninth Day of July 1986

[SEAL]

Attest:

Attesting Officer

DONALD J. QUIGG

Commissioner of Patents and Trademarks